(12) United States Patent
Hamagishi

(10) Patent No.: US 7,733,569 B2
(45) Date of Patent: Jun. 8, 2010

(54) IMAGE DISPLAY DEVICE

(75) Inventor: Goro Hamagishi, Toyonaka (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 12/026,247

(22) Filed: Feb. 5, 2008

(65) Prior Publication Data

US 2008/0192356 A1  Aug. 14, 2008

(30) Foreign Application Priority Data

Feb. 8, 2007  (JP) .............................. 2007-029384
Nov. 6, 2007  (JP) .............................. 2007-288608

(51) Int. Cl.
G02B 27/10  (2006.01)
(52) U.S. Cl. .................... 359/619; 359/621; 359/622
(58) Field of Classification Search .......... 359/619–624
See application file for complete search history.

(56) References Cited

U.S. PATENT DOCUMENTS

| | | | |
|---|---|---|---|
| 6,570,324 B1 * | 5/2003 | Tutt et al. .................... 313/500 |
| 6,819,280 B2 * | 11/2004 | Huang et al. ................ 341/162 |
| 7,310,186 B2 * | 12/2007 | Lerner et al. ................ 359/641 |
| 7,414,790 B2 * | 8/2008 | Raymond et al. ........... 359/626 |
| 7,583,327 B2 * | 9/2009 | Takatani ...................... 349/15 |
| 2006/0114374 A1 * | 6/2006 | Segawa et al. ............... 349/95 |

FOREIGN PATENT DOCUMENTS

| JP | 08-062533 | 3/1996 |
|---|---|---|
| JP | 11338055 A * | 12/1999 |
| JP | 2005-172925 | 6/2005 |

* cited by examiner

Primary Examiner—Joseph Martinez
Assistant Examiner—Brandi N Thomas
(74) Attorney, Agent, or Firm—Workman Nydegger

(57) ABSTRACT

Provided is an image display device including: an image forming layer for forming a plurality of images; and a lens layer which is integrally provided with the image forming layer and includes a plurality of lenses for guiding the plurality of images formed in the image forming layer in a plurality of corresponding directions.

7 Claims, 6 Drawing Sheets

COMPARATIVE EXAMPLE

EMBODIMENT

COMPARATIVE EXAMPLE

IMAGE DISPLAY DEVICE

BACKGROUND

1. Technical Field

The present invention relates to an image display device and a technology of displaying a plurality of images.

2. Related Art

Recently, an image display apparatus (a stereoscopic image display apparatus) for allowing an observer to observe a stereoscopic image by the naked eyes has been developed. For example, in a twin-lens stereoscopic image display device, two parallax images are displayed and are guided in two directions. An angle between the two directions is relatively small. The observer observes a first parallax image by the right eye and observes a second parallax image by the left eye, thereby observing the stereoscopic image.

The stereoscopic image display apparatus generally includes a liquid crystal panel and a barrier plate or a lens plate. The barrier plate is a light-shielding plate in which a plurality of openings is formed. The lens plate includes a plurality of cylindrical lenses.

Recently, an image display apparatus (a two-dimensional image display apparatus) for allowing an observer to observe an image (a two-dimensional image) which varies according to the position thereof has been developed. For example, in a two-dimensional image display device for two screens, two images are displayed and are guided in two directions. An angle between the two directions is relatively large. An observer who is positioned in a first region can observe a first image and an observer who is positioned in a second region can observe a second image.

The two-dimensional image display apparatus generally includes a liquid crystal panel and a barrier plate (JP-A-2005-172925).

If the barrier plate is used, since a portion of light is blocked by the barrier plate, the brightness of the image is reduced compared with a case where the lens plate is used. Accordingly, the lens plate is preferably used.

However, in the known two-dimensional image display apparatus, the lens plate was used. This is because, if the lens plate is used, it is difficult to increase the angle between the two directions in which the two images are guided, compared with the case where the barrier plate is used. This problem occurs even in the stereoscopic image display device.

SUMMARY

An advantage of some aspects of the invention is that an angle between a plurality of directions in which a plurality of images are guided is increased even when a lens is used in order to guide the plurality of images in the plurality of directions.

According to an aspect of the invention, there is provided an image display device including: an image forming layer for forming a plurality of images; and a lens layer which is integrally provided with the image forming layer and includes a plurality of lenses for guiding the plurality of images formed in the image forming layer in a plurality of corresponding directions.

In this image display device, since the lens layer is integrally provided with the image forming layer, it is possible to decrease a distance between the image forming layer and the lens layer. As a result, it is possible to increase an angle between the directions in which images are guided.

The lens layer may be adjacent to the image forming layer.

The image display device may further include a light transmission plate, and the lens layer may be formed in the light transmission plate.

By this configuration, it is possible to significantly thin the image display device.

The image display device may further include a light transmission plate, and the lens layer may be provided between the light transmission plate and the image forming layer.

By this configuration, it is possible to readily realize the lens layers of various aspects.

The lens layer may include a first layer having a first refractive index; and a second layer having a second refractive index lower than the first refractive index, and the first layer may include a plurality of convex surfaces at the side of the second layer.

The lens layer further may include a third layer having a third refractive index higher than the second refractive index, the second layer may be provided between the first layer and the third layer, and the third layer may include a plurality of convex surfaces at the side of the second layer.

The lens layer may further include a fourth layer having a fourth refractive index lower than the first refractive index, the first layer may be provided between the second layer and the fourth layer, and the first layer may include a plurality of convex surfaces at the side of the fourth layer.

Any one of the first layer and the second layer included in the lens layer may be provided on the light transmission plate, and the refractive index of any one of the first layer and the second layer may be substantially equal to that of the light transmission plate.

By this configuration, it is possible to suppress the reflection of light between any one layer and the light transmission plate due to a difference between the refractive indexes of any one layer and the light transmission plate.

Each of the plurality of lenses included in the lens layer may have a plane portion in a most protruding region.

Each of the plurality of lenses included in the lens layer may have a Fresnel cross-section.

By this configuration, it is possible to decrease the thickness of the lens layer.

The image forming layer may include a plurality of pixels, and the plurality of lenses included in the lens layer may be provided for at least two pixels, which are continuous in one direction, among the plurality of pixels.

The lens layer may be provided nearer to an observer side than the image forming layer.

The image forming layer may include a liquid crystal layer.

The invention can be realized in various aspects, for example, an image display device, an image display apparatus including the device, and a method of manufacturing the image display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Next, embodiments of the invention will be described in the following sequence.

A. Configuration of Image Display Apparatus
B. Configuration of Liquid Crystal Panel
C. Comparison between Embodiment and Comparative Example
D. Modified Example of Liquid Crystal Panel
E. Modified Example of Lens Shape

A. Configuration of Image Display Apparatus

Figure 1:
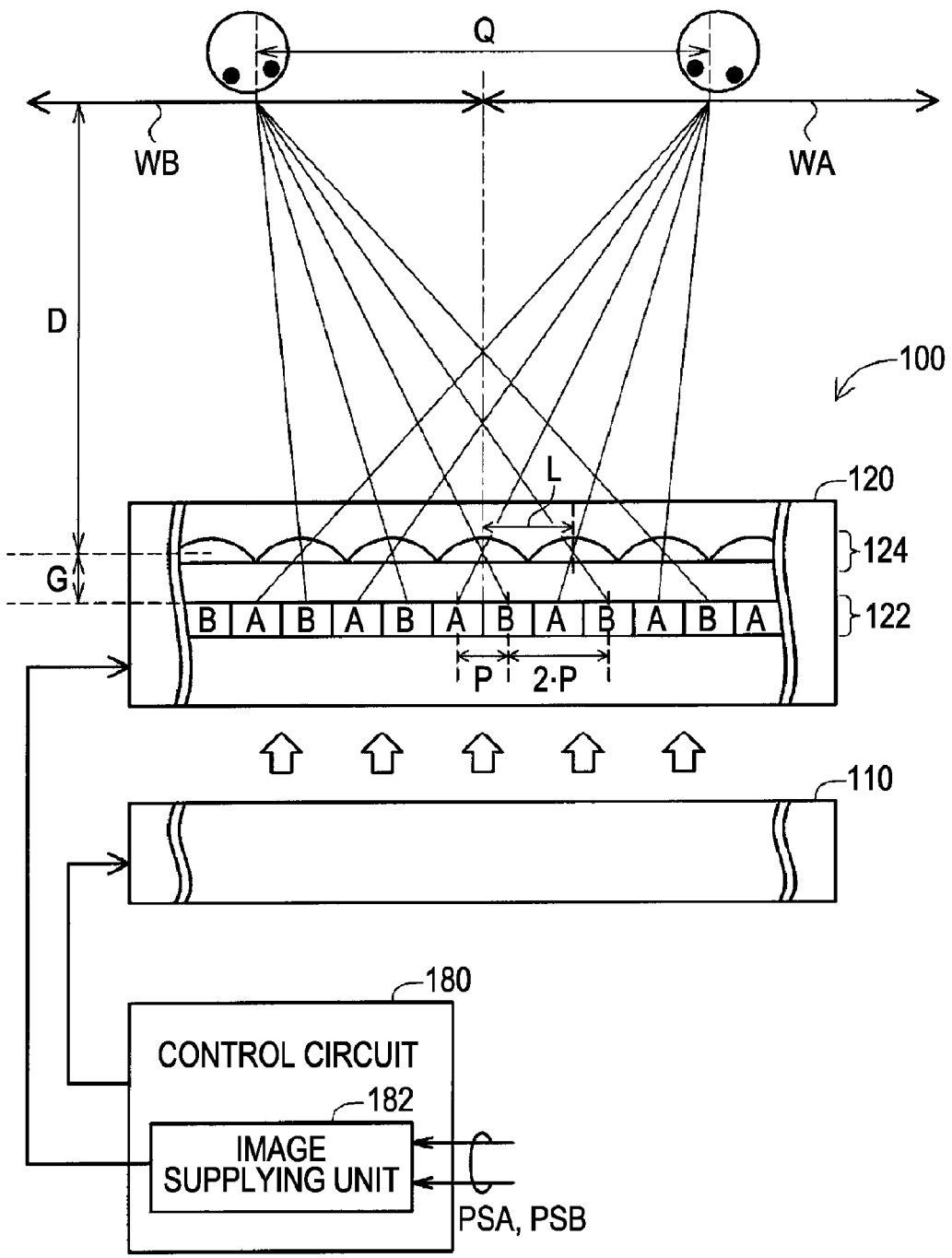
FIG. 1 is a schematic view showing the configuration of an image display apparatus 100.

FIG. 1 is a schematic view showing the configuration of an image display apparatus 100. The image display apparatus 100 includes a backlight 110, a liquid crystal panel 120 and a control circuit 180. The liquid crystal panel 120 corresponds to an image display device according to the invention.

The backlight 110 emits light for illuminating the liquid crystal panel 120. The backlight 110 includes, for example, a light-emitting device and a diffusion plate.

The liquid crystal panel 120 includes an image forming layer 122 and a lens layer 124. In the present embodiment, the lens layer 124 is provided nearer to an observer side than the image forming layer 122.

The image forming layer 122 forms a significant image, that is, an image which will be observed by the observer. In more detail, the image forming layer 122 forms a display image in accordance with display image data received from the control circuit 180. The display image includes a plurality of images. For example, in FIG. 1, the display image includes a first image A and a second image B. Pixels configuring the first image A and pixels configuring the second image B in the liquid crystal panel 120 are alternately arranged in a horizontal direction (a row direction).

The lens layer 124 guides the plurality of images formed in the image forming layer 122 in a plurality of corresponding directions (that is, viewing points). In more detail, the lens layer 124 is a lenticular lens in which a plurality of cylindrical lenses are arranged in the horizontal direction (the row direction). In FIG. 1, the cylindrical lenses are provided for adjacent two pixels of the plurality of pixels arranged in the horizontal direction (the row direction). The two images A and B formed in the image forming layer 122 are guided by the lens layer 124 in the two corresponding directions.

In addition, a pitch P between the pixels of the image forming layer 122 and a pitch L between the cylindrical lenses of the lens layer 124 are set so as to satisfy Equation 1.

$$2 \cdot P : L = D + G : D$$

$$P : Q = G : D \quad \text{Equation 1}$$

where, D denotes a proper viewing distance, that is, a distance between an observer and the liquid crystal panel 120 (in more detail, the lens layer 124) and is, for example, set to about 0.5 to 2 m. In addition, D is a value decided by a maker at the time of designing the image display apparatus 100. The observer can observe the image A and B at a position (a proper viewing position) separated from the liquid crystal panel 120 by the proper viewing distance D. Q denotes an interval between the two images A and B at the proper viewing distance D and is equal to the widths of regions (proper viewing regions) WA and WB which can properly observe the images at the proper viewing distance D. G denotes a distance between the image forming layer 122 and the lens layer 124.

Although not shown in FIG. 1, polarization plates are provided at a light incident surface side and a light emitting surface side of the liquid crystal panel 120.

The control circuit 180 controls the image display apparatus 100. In more detail, the control circuit 180 controls the operation of the backlight 110 and the operation of the liquid crystal panel 120. The function of the control circuit 180 is implemented by allowing a CPU to execute a computer program stored in a memory. The computer program is provided in the form recorded on a computer-readable recording medium such as CD-ROM.

The control circuit 180 includes an image supplying unit 182. The image supplying unit 182 generates display image data using two image data PSA and PSB received from an external device. At the time of generating the display image data, the image data is subjected to thinning processing. The image supplying unit 182 supplies the display image data to the liquid crystal panel 120. The control circuit 180 controls ON/OFF of the backlight 110.

FIG. 2 is a view showing a process of displaying two images A and B. FIG. 2A shows a display image formed in the image forming layer 122. FIG. 2B shows the lens layer 124. FIGS. 2C and 2D show images observed by the observer.

Figure 2A:
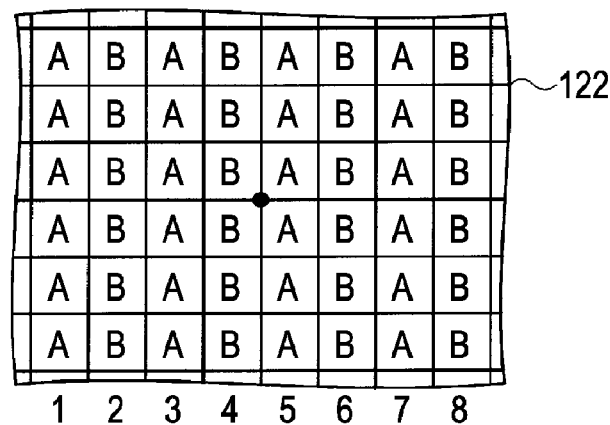
FIG. 2 is a view showing a process of displaying two images A and B.

As shown in FIG. 2A, the display image includes the first image A and the second image B. In FIG. 2A, a group of pixels belonging to odd-numbered columns configure the first image A and a group of pixels belonging to even-numbered columns configure the second image B. The group of pixels of each column includes pixels of red, green and blue.

Figure 2B:
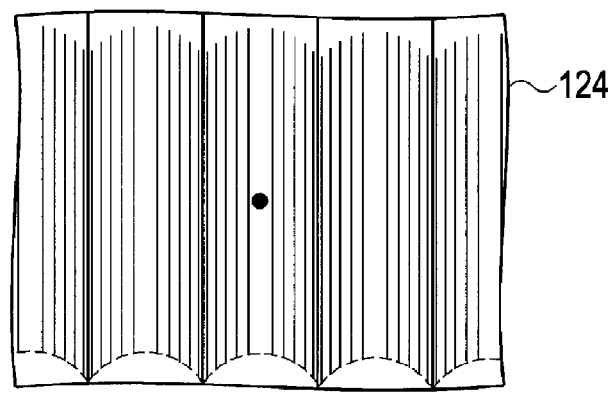

As shown in FIG. 2B, the lens layer 124 includes the plurality of cylindrical lenses and one cylindrical lens is provided in correspondence with the group of pixels belonging to two columns of the image forming layer 122.

Figure 2C:
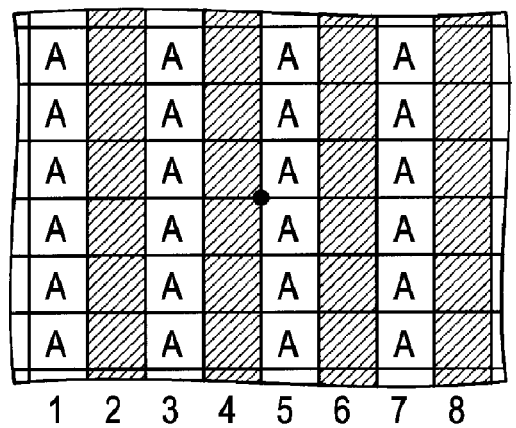
Figure 2D:
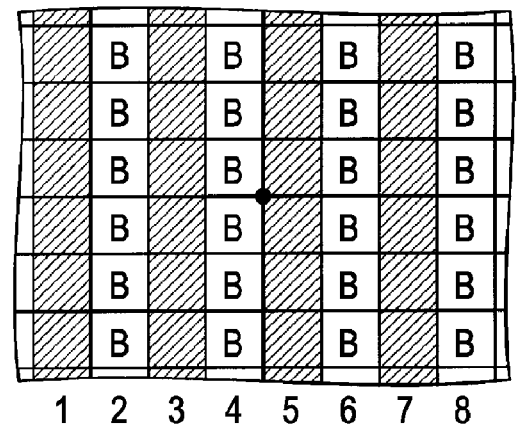

If the display image shown in FIG. 2A is formed on the liquid crystal panel 120, an observer who is positioned in a first proper viewing region WA can observe only the first image A in the display image as shown in FIG. 2C and an observer who is positioned in a second proper viewing region WB can observe only the second image B in the display image as shown in FIG. 2D. This is because light emitted from the group of pixels configuring the first image A of the liquid crystal panel 120 is guided to the first proper viewing region WA by the lens layer 124 and is not guided to the second proper viewing region WB and light emitted from the group of pixels configuring the second image B of the liquid crystal panel 120 is guided to the second proper viewing region WB by the lens layer 124 and is not guided to the first proper viewing region WA.

Accordingly, the observer can observe the two different images A and B according to the position thereof.

B. Configuration of Liquid Crystal Panel

Figure 3:
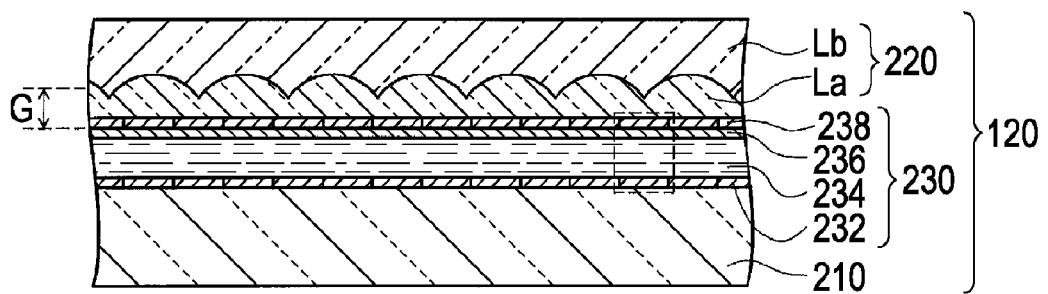
FIG. 3 is a view showing the detailed configuration of a liquid crystal panel 120.

FIG. 3 is a view showing the detailed configuration of a liquid crystal panel 120. As shown, the liquid crystal panel 120 includes a first glass substrate 210 provided at the side of the backlight 110 (FIG. 1), a second glass substrate 220 provided at the observer side, and a cell array 230 interposed between the two glass substrates 210 and 220. The cell array 230 includes a plurality of cells arranged in a matrix. In FIG. 3, a portion surrounded by a dotted line is one cell (pixel).

The cell array 230 includes a transistor layer 232, a liquid crystal layer 234, an electrode layer 236 and a color filter layer 238. The transistor layer 232 includes a plurality of thin-film transistor (TFT) corresponding to the plurality of cells. The electrode layer 236 is a common electrode (a transparent electrode). The color filter layer 238 includes color filters corresponding to the cells and more particularly filters of red, blue and green.

The second glass substrate 220 includes a first layer La having a relatively high refractive index and a second layer Lb having a relatively low refractive index. The first layer La is a lenticular lens having a plurality of convex surfaces at the side of the second layer Lb.

The cell array 230 corresponds to the image forming layer 122 of FIG. 1. The first layer La included in the second glass substrate 220 corresponds to the lens layer 124 of FIG. 1. As can be seen from the description, the second glass substrate 220 according to the present embodiment corresponds to a light transmission plate according to the invention.

The liquid crystal panel 120 is manufactured as follows. First, the first glass substrate 210 is prepared and the transistor layer 232 is formed on the first glass substrate 210. The second glass substrate 220 is prepared and the color filter layer 238 and the electrode layer 236 are formed on the second glass substrate 220 in this order. Thereafter, the liquid crystal layer 234 is sealed between the processed first glass substrate 210 and the processed second glass substrate 220 and more particularly the transistor layer 232 formed on the first glass substrate 210 and the electrode layer 236 formed on the second glass substrate 220. Accordingly, the liquid crystal panel 120 is obtained.

The second glass substrate 220 is manufactured using ion exchange in the present embodiment. In this method, first, a glass substrate including Na or K is prepared. Next, a mask (for example, a Ti film) is formed on the glass substrate. The mask has a plurality of openings having a slit shape. Thereafter, the glass substrate having the mask formed thereon is immersed in molten salt for ion exchange (for example, salt containing Tl, Li, Ag or Ce) such that ion exchange is performed through the plurality of openings. As a result, a plurality of cylindrical regions each having a semi-circular cross-section is formed in the glass substrate. Each of these regions has a refractive index higher than that of the glass substrate and has a refractive index distribution having a concentric shape. Accordingly, the second glass substrate 220 is obtained. This method is, for example, disclosed in JP-A-43306 or JP-A-248905.

As described above, in the present embodiment, since the lens layer 124 (La) is formed in the liquid crystal panel 120, it is possible to decrease a distance G between the image forming layer 122 (230) and the lens layer 124 (La). If the lens layer 124 is formed in the liquid crystal panel 120, it is possible to readily divide the two images A and B, as described below. In other words, it is possible to readily increase an angle between the two directions in which the two images are guided.

C. Comparison Between Embodiment and Comparative Example

Hereinafter, a comparative example will be described and advantages of the embodiment will be described while comparing the embodiment with the comparative example.

Figure 4:
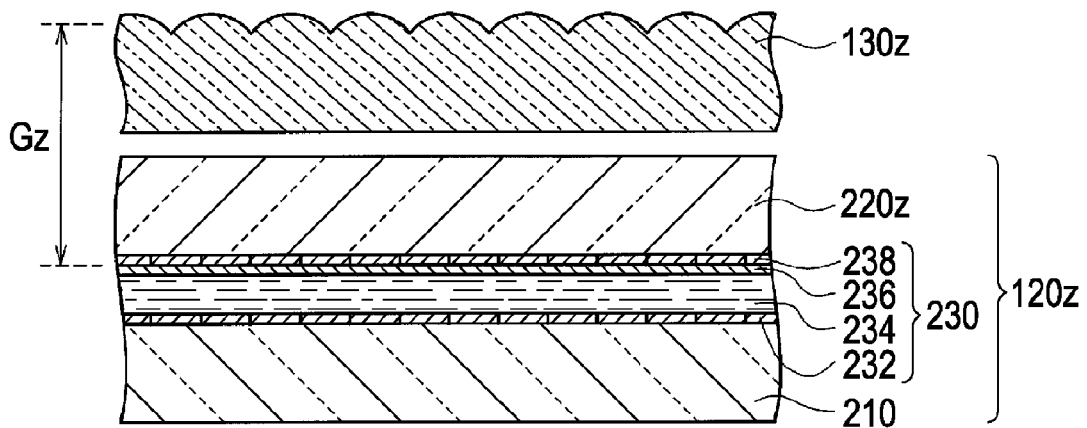
FIG. 4 is a view showing the configuration of a comparative example corresponding to the liquid crystal panel 120 shown in FIG. 3.

FIG. 4 is a view showing the configuration of the comparative example corresponding to the liquid crystal panel 120 shown in FIG. 3. As shown, in the comparative example, a liquid crystal panel 120z and a lens plate 130z provided at a light emitting surface side of the liquid crystal panel 120z are used, instead of the liquid crystal panel 120 shown in FIG. 3.

The liquid crystal panel 120z is approximately equal to the liquid crystal panel 120 shown in FIG. 3, but is different therefrom in a second glass substrate 220z. In more detail, since the lens plate 130z is included, the lens layer 124 is not provided in the second glass substrate 220z. The lens plate 130z is a lenticular lens similar to the lens layer 124.

As can be seen from FIGS. 3 and 4, in the comparative example, since the lens plate 130z is separately provided outside the liquid crystal panel 120z, the thickness of the lens plate 130z is large. This is because a support substrate (for example, a glass substrate) for supporting the lenticular lens is required. As a result, the distance Gz between the image forming layer 122 (230) and the lens plate 130z is significantly larger than the distance G between the image forming layer 122 (230) and the lens layer 124 of the embodiment. For example, the distance G of the embodiment is about 50 μm, but the distance Gz of the comparative example is generally larger than about 500 μm.

Even in the comparative example, if the glass substrate 220z and the lens plate 130z are polished, it is possible to decrease the distance Gz between the image forming layer 122 and the lens plate 130z. However, generally, it is difficult to polish the glass substrate 220z and the support substrate of the lens plate 130z with high precision. This is because surface roughness (for example, about 30 μm) after polishing is relatively large with respect to the thickness (for example, about 50 μm) of the support substrate and the polished glass substrate.

Figure 5A:
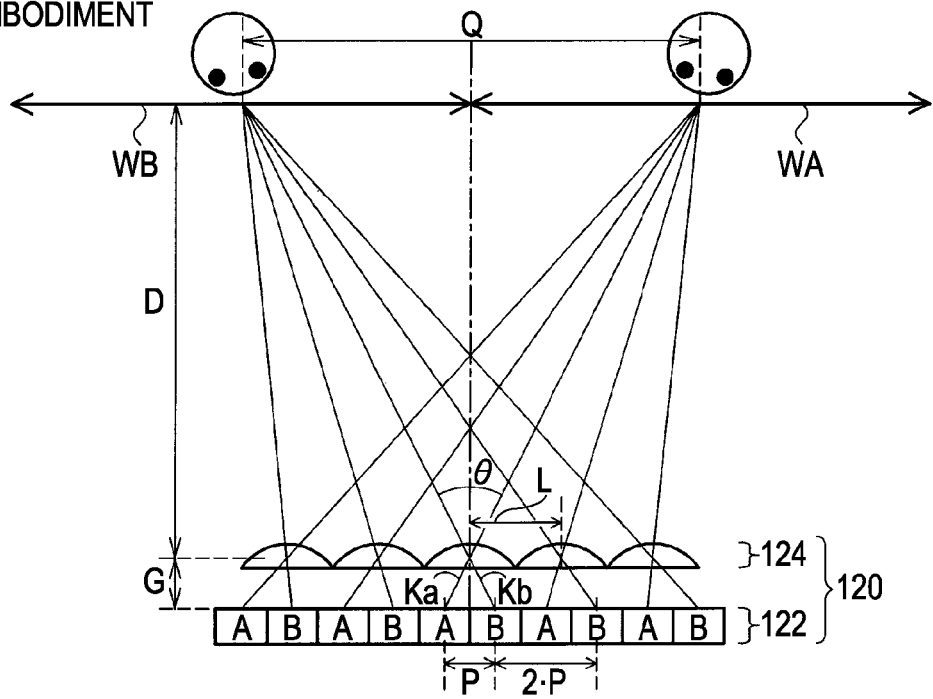
FIG. 5 is a view showing two proper viewing regions corresponding to the two images A and B in an embodiment and a comparative example.
Figure 5B:
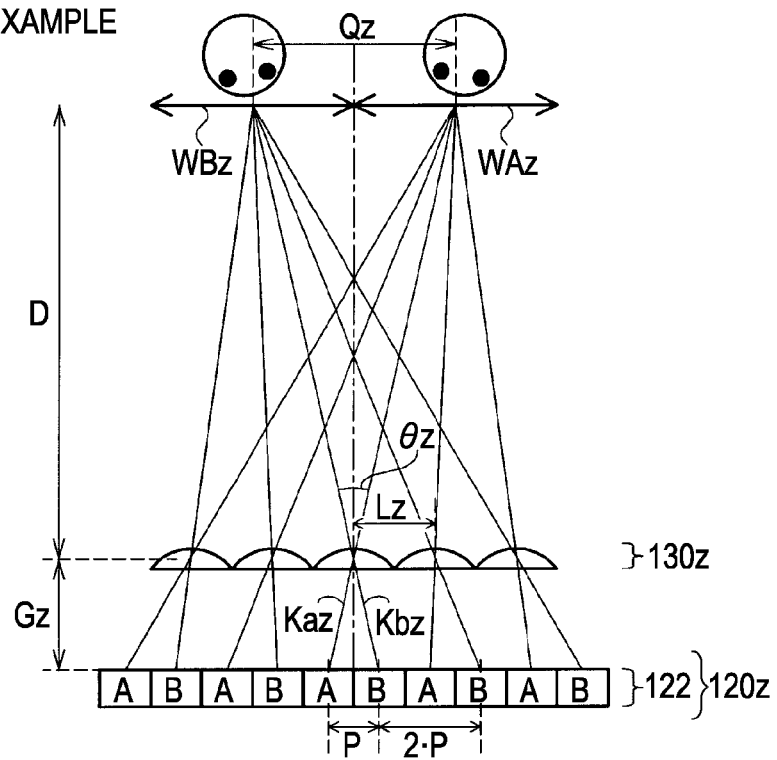

FIG. 5 is a view showing two proper viewing regions corresponding to the two images A and B in the embodiment and the comparative example. FIG. 5A shows the two proper viewing regions WA and WB in the embodiment and FIG. 5B shows the two proper viewing regions WAz and WBz in the comparative example. In FIGS. 5A and 5B, the same proper viewing distance D is realized.

Even in the comparative example, similar to the embodiment, an observer who is positioned in the first proper viewing region WAz can observe the first image A and an observer who is positioned in the second proper viewing region WBz can observe the second image B.

The width Qz of the proper viewing regions WAz and WBz of the comparative example is smaller than the width Q of the proper viewing regions WA and WB of the embodiment. This is because the distance Gz of the comparative example is larger than the distance G of the embodiment as described above and, as a result, an angle for dividing the two images A and B (hereinafter, referred to as a division angle) θz of the comparative example is smaller than the division angle θ of the embodiment.

Here, the division angle θ (θz) indicates an angle between two straight lines ka and Kb (Kaz and Kbz) for connecting two centers of two adjacent pixels positioned in vicinity of the center of the liquid crystal panel 120 (120z) and the center of one cylindrical lens corresponding to the two pixels.

In FIGS. 5A and 5B, since the same proper viewing distance D is realized, a pitch Lz of the comparative example is set to be smaller than a pitch L of the embodiment.

As shown in FIGS. 5A and 5B, if the same proper viewing distance D is realized in the embodiment and the comparative example, the width Q of the proper viewing regions WA and WB of the embodiment can be set to be larger than that of the comparative example. As can be seen from Equation 1, if the same width Q of the proper viewing regions is realized in the embodiment and the comparative example, the proper viewing distance D of the embodiment can be set to be smaller than that of the comparative example.

D. Modified Example of Liquid Crystal Panel

Although the lens layer 124 is formed in the second glass substrate 220 in the embodiment, the lens layer may be formed outside the second glass substrate. Even in a modified example, the lens layer is formed in the liquid crystal panel, similar to the embodiment.

FIG. 6 is a view showing various modified examples of the liquid crystal panel. FIG. 6A shows a liquid crystal panel 120A in a first modified example. The liquid crystal panel 120A is approximately equal to the liquid crystal panel 120 shown in FIG. 3, but includes a second glass substrate 220A and a lens layer 224A, instead of the second glass substrate 220. The lens layer 224A corresponds to the lens layer 124 of FIG. 1. The lens layer 224A includes two layers LA1 and LA2 having different refractive indexes. The first layer LA1 is provided at the side of the second glass substrate 220A and has a relatively low refractive index. The second layer LA2 is provided at the side of the cell array 230 and has a relatively high refractive index. The second layer LA2 is a lenticular lens having a plurality of convex surfaces at the side of the first layer LA1.

Figure 6A:
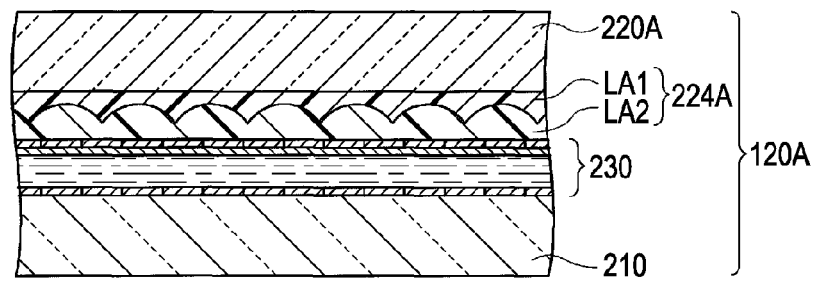
FIG. 6 is a view showing various modified examples of the liquid crystal panel.

The second layer LA2 of FIG. 6A corresponds to a first layer of the invention and the first layer LA1 corresponds to a second layer of the invention.

Figure 6B:
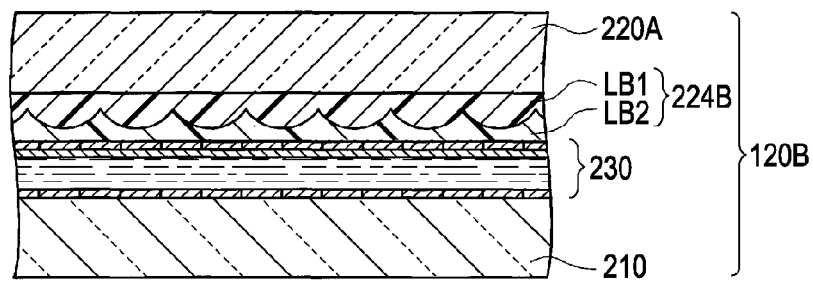

FIG. 6B shows a liquid crystal panel 120B according to a second modified example. The liquid crystal panel 120B is approximately equal to the liquid crystal panel 120A of FIG. 6A, but is different therefrom in a lens layer 224B. In more detail, the lens layer 224B includes two layers LB1 and LB2 having different refractive indexes. The first layer LB1 is provided at the side of the second glass substrate 220A and has a relatively high refractive index. The second layer LB2 is provided at the side of the cell array 230 and has a relatively low refractive index. The first layer LB1 is a lenticular lens having a plurality of convex surfaces at the side of the second layer LB2.

The first layer LB1 of FIG. 6B corresponds to the first layer of the invention and the second layer LB2 corresponds to the second layer of the invention.

Figure 6C:
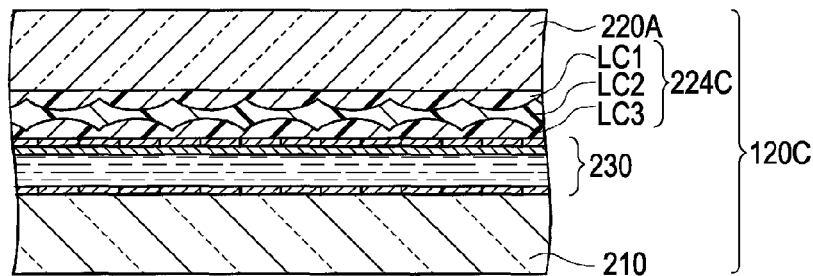

FIG. 6C shows a liquid crystal panel 120C according to a third modified example. The liquid crystal panel 120C is approximately equal to the liquid crystal panels 120A and 120B of FIGS. 6A and 6B, but is different therefrom in a lens layer 224C. In more detail, the lens layer 224C includes three layers LC1 to LC3. The first layer LC1 and the third layer LC3 are respectively provided at the sides of the second glass substrate 220A and the cell array 230 and have relatively high refractive indexes. The second layer LC2 is provided between the first and third layers LC1 and LC3 and has a relatively low refractive index. The first layer LC1 is a lenticular lens having a plurality of convex surfaces at the side of the second layer LC2. In addition, the third layer LC3 is a lenticular lens having a plurality of convex surfaces at the side of the second layer LC2. The refractive indexes of the two layers LC1 and LC3 may be equal to or different from each other.

The first, second and third layers LC1, LC2 and LC3 of FIG. 6C correspond to the first, second and third layers of the invention, respectively.

Figure 6D:
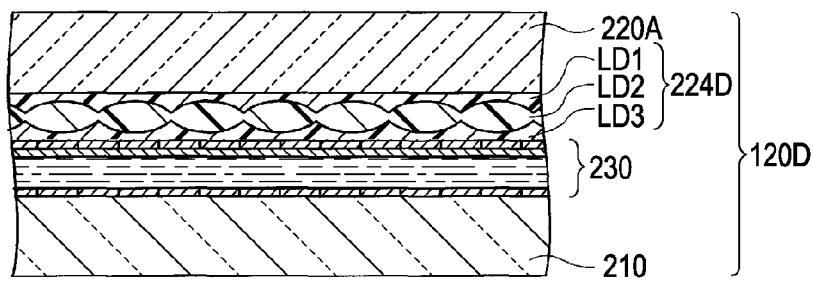

FIG. 6D shows a liquid crystal panel 120D according to a fourth modified example. The liquid crystal panel 120D is approximately equal to the liquid crystal panels 120A to 120C of FIGS. 6A to 6C, but is different therefrom in a lens layer 224D. In more detail, the lens layer 224D includes three layers LD1 to LD3. The first layer LD1 and the third layer LD3 are respectively provided at the sides of the second glass substrate 220A and the cell array 230 and have relatively low refractive indexes. The second layer LD2 is provided between the first and third layers LD1 and LD3 and has a relatively high refractive index. The second layer LD2 is a lenticular lens having a plurality of convex surfaces at the sides of the first layer LD1 and the third layer LD3. The refractive indexes of the two layers LD1 and LD3 may be equal to or different from each other.

The first, second and third layers LD1, LD2 and LD3 of FIG. 6D correspond to the second, first and fourth layers of the invention, respectively.

The lens layers 224A to 224D shown in FIGS. 6A to 6D can be manufactured using various methods.

In the present embodiment, the lens layers 224A to 224D are manufactured by sequentially forming the layers on the second glass substrate 220A using photosetting resin. For example, in a case where the lens layer 224A of FIG. 6A is manufactured, first, a first type of resin is coated on the second glass substrate 220A so as to provide a first resin layer. Next, a plurality of concave surfaces is formed in the surface of the first resin layer using a first molding tool. Thereafter, light (for example, ultraviolet rays) is irradiated onto the first resin layer so as to form the first layer LA1 having a relative low refractive index. Subsequently, a second type of resin layer is coated on the first layer LA1 so as to form the second resin layer. Next, a plane is formed in the surface of the second resin layer using a second molding tool. Thereafter, light is irradiated onto the second resin layer so as to form the second layer LA2 having a relatively high refractive index. Thus, the lens layer 224A is formed on the second glass substrate 220A. In addition, thereafter, similar to the embodiment, the color filter layer 238 and the electrode layer 236 are sequentially formed on the lens layer 224A.

Although the photosetting resin is used in the present embodiment, thermosetting resin may be used.

Among the plurality of layers configuring the lens layers 224A to 224D, it is preferable that the refractive indexes of the layers LA1 to LD1 formed on the second glass substrate 220A are substantially equal to that of the second glass substrate 220A. For example, a difference between the refractive indexes of the layers LA1 to LD1 and the refractive index of the second glass substrate 220A is preferably 0.05 or less and more preferably 0.01 or less. Accordingly, it is possible to suppress the reflection of a portion of the light representing the image between the layers LA1 to LD1 and the second glass substrate 220A.

As described above, since the lens layers 224A to 224D are formed between the second glass substrate 220A and the cell array 230 in the modified examples, it is possible to readily manufacture the lens layers of various aspects.

E. Modified Example of Lens Shape

In FIGS. 6A to 6D, the lens layers 224A to 224D include a plurality of lenses (cylindrical lenses) extending in a direction vertical to the drawing. Each of the lenses has a semi-circular cross-sectional shape and may have other cross-sectional shape.

Figure 7:
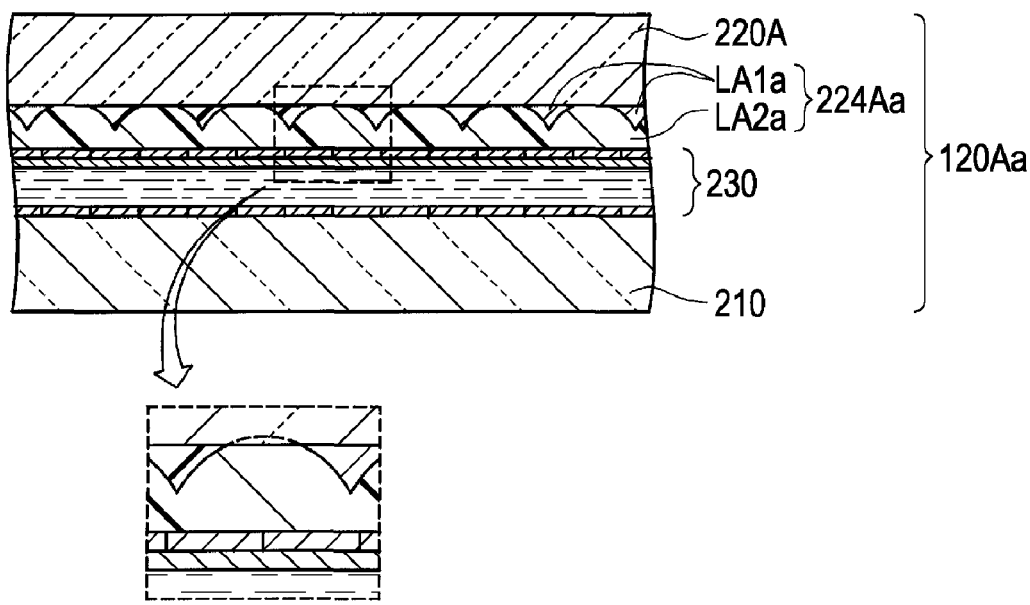
FIG. 7 is a view showing a first modified example of a lens shape.

FIG. 7 is a view showing a first modified example of a lens shape. A liquid crystal panel 120Aa shown in FIG. 7 is approximately equal to the liquid crystal panel 120A of FIG. 6A and is different therefrom in a lens layer 224Aa. In more detail, the shape of a first layer LA1a having a relatively low refractive index and the shape of a second layer LA2a having a relatively high refractive index are changed.

The second layer LA2a is a lenticular lens having a plurality of convex surfaces at the side of the first layer LA1a and includes a plurality of lenses extending in the direction vertical to the drawing. As can be seen from the comparison between FIGS. 6A and 7, the convex surfaces of the second layer LA2a shown in FIG. 7 include plane portions in most protruding regions. The plane portions are in contact with the second glass substrate 220A.

If the lens layer 224Aa in which the plane portions are formed in the most protruding regions of the lenses is used, it is possible to decrease the thickness of the lens layer 224A.

Figure 8:
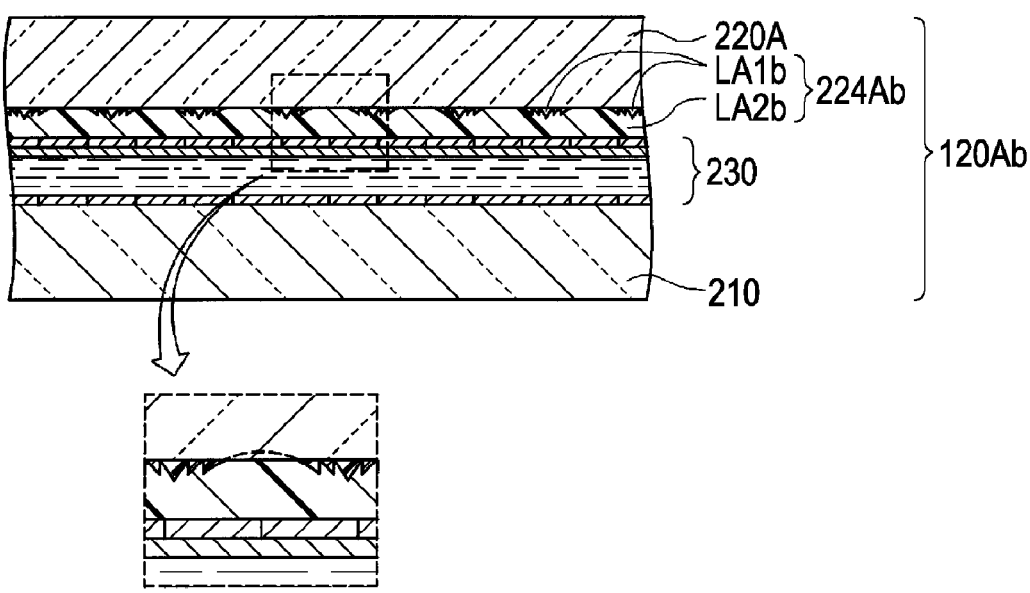
FIG. 8 is a view showing a second modified example of the lens shape.

FIG. 8 is a view showing a second modified example of the lens shape. A liquid crystal panel 120Ab shown in FIG. 8 is approximately equal to the liquid crystal panel 120A of FIG. 6A and is different therefrom in a lens layer 224Ab. In more detail, the shape of a first layer LA1b having a relatively low refractive index and the shape of a second layer LA2b having a relatively high refractive index are changed.

The second layer LA2b is a lenticular lens having a plurality of convex surfaces at the side of the first layer LA1b and includes a plurality of lenses extending in the direction vertical to the drawing. As can be seen from the comparison between FIGS. 6A and 8, the convex surfaces of the second layer LA2b shown in FIG. 8 have the same cross-section as a Fresnel lens (a Fresnel cross-section). The convex surfaces of the second layer LA2b include plane portions in most protruding regions, similar to FIG. 7. The plane portions are in contact with the second glass substrate 220A.

If the lens layer 224Ab in which the lenses have the Fresnel cross-section and the plane portions are formed in the most protruding regions of the lenses is used, it is possible to significantly decrease the thickness of the lens layer 224Ab.

As shown in FIGS. 7 and 8, if the shape of the lens is changed, the thicknesses of the lens layers 224Aa and 224Ab can be set to be smaller than that of the lens layer 224A of FIG. 6A. Accordingly, it is possible to decrease the thicknesses of the liquid crystal panels 120Aa and 120Ab.

Even when the lens layers 224Aa and 224Ab shown in FIGS. 7 and 8 are employed, it is possible to guide the two images A and B in the two corresponding directions (see FIG. 1). This is because the plane portions of the lenses included in the lens layers 224Aa and 224Ab do not function as the lens and performs the same functions as the openings of the barrier plate. That is, the light which is emitted from the group of pixels configuring the image A and passes through the plane portions of the lens layers 224Aa and 224Ab is guided to an observer who is positioned in the first proper viewing region WA, but is not guided to an observer who is positioned in the second proper viewing region WB. In contrast, the light which is emitted from the group of pixels configuring the image B and passes through the plane portions of the lens layers 224Aa and 224Ab is guided to the observer who is positioned in the second proper viewing region WB, but is not guided to an observer who is positioned in the first proper viewing region WA. As a result, the observer who is positioned in the proper viewing region WA can observe only the image A and the observer who is positioned in the proper viewing region WB can observe only the image B.

In the two layers configuring the lens layers 224Aa and 224Ab shown in FIGS. 7 and 8, it is preferable that the refractive indexes of the first layers LA1a and LA1b formed on the second glass substrate 220A are substantially equal to that of the second glass substrate 220A. Accordingly, it is possible to suppress the reflection of the light at the interface between the second glass 220A and the first layers LA1a and LA1b. In this case, the second layers LA2a and LA2b include the plane portions which are in contact with the second glass substrate 220A. The refractive indexes of the second layers LA2a and LA2b may be set to be approximately equal to that of the second glass substrate 220A. Accordingly, it is possible to suppress the reflection of the light between the second glass substrate 220A and the second layers LA2a and LA2b.

The lens layers 224Aa and 224Ab shown in FIGS. 7 and 8 can be manufactured using the method described in FIG. 6. In particular, in a case where the lens layers 224Aa and 224Ab shown in FIGS. 7 and 8 are employed, it is possible to more flatten the surface of the lens layer at the side of the cell array 230, compared with a case the lens layer 224A of FIG. 6A is employed.

In more detail, in a case where the lens layer 224A of FIG. 6A is formed, as described above, the first layer LA1 is formed on the second glass substrate 220 and then the second layer LA2 is formed thereon. That is, at the time of forming the second layer LA2, the first layer LA1 having irregularities is already formed. A difference between the irregularities of the first layer LA1 (that is, a difference between a highest position and a lowest position of the irregularities) depends on the shape of the semi-circular cross-section of the lens. Accordingly, if a second type of resin is coated on the first layer LA1 when the second layer LA2 is formed, relatively large irregularities due to the difference between the irregularities of the first layer LA1 are formed in the second resin layer. As a result, it is difficult to flatten the surface of the second layer LA2 at the side of the cell array 230.

In contrast, even when the lens layers 224Aa and 224Ab shown in FIGS. 7 and 8 are formed, the first layers LA1a and LA1b having irregularities are already formed at the time of forming the second layers LA2a and LA2b. However, the difference between the irregularities of the first layers LA1a and LA1b is smaller than the difference between the irregularities of the first layer LA1 of FIG. 6A. This is because the lenses include the plane portions in the most protruding regions in FIG. 7 and the lenses have the Fresnel cross-section and include the plane portions in the most protruding regions in FIG. 8. Accordingly, if a second type of resin is coated on the first layers LA1a and LA1b when the second layers LA2a and LA2b are formed, relatively small irregularities due to the difference between the irregularities of the first layers LA1a and LA1b are formed in the second resin layer. As a result, it is possible to more flatten the surfaces of the second layers LA2a and LA2b at the side of the cell array 230.

Although the lens layers 224A, 224Aa and 224Ab and the cell array 230 are adjacent in FIGS. 6A, 7 and 8, in order to adjust the distance between the lens layer and the cell array, a film layer such as a resin film or a plastic film may be interposed between the lens layer and the cell array. In this case, for example, the film layer is attached to the lens layer formed on the second glass substrate 220A and the color filter layer 238 or the electrode layer 236 are formed on the film layer. Even in this case, if the lens layers 224Aa and 224Ab shown in FIGS. 7 and 8 are employed, it is possible to more flatten the surface of the film layer.

Although the lenses include the plane portions in the most protruding regions in FIG. 8, the plane portions may be omitted. In this case, the lenses may have the Fresnel cross-section. Even in this case, it is possible to decrease the thickness of the lens layer and flatten the surface of the lens layer at the side of the cell array.

Although the modification of the lens shape is applied to the lens layer 224A of FIG. 6A in FIGS. 7 and 8, it is applicable to the lens layers 224B to 224D of FIGS. 6B to 6D.

As described above, in the present embodiment (and the modified example), the image forming layer 122 and the lens layers 124 (La, 224A to 224D, 224Aa and 224Ab) are provided in the liquid crystal panel 120. In other words, in the present embodiment, the lens layer 124 is integrally provided with the image forming layer 122. Here, the expression that the lens layer 124 is integrally provided with the image forming layer 122 indicates that the image forming layer 122 and the lens layer 124 are adjacent to each other as shown in FIGS. 3 and 6 and includes both a case where the image forming layer 122 is directly connected to the lens layer 124 and a case where another layer (for example, the film layer) is interposed between the image forming layer such that the image forming layer is indirectly connected to the lens layer. Accordingly, it is possible to decrease the distance between the image forming layer 122 and the lens layer 124 and, as a result, it is possible to increase the angle (the division angle) between the two directions in which the two images A and B are guided.

As described above, in a case where the same proper viewing distance D is realized in the embodiment and the comparative example, it is possible to increase the widths Q of the proper viewing regions WA and WB by employing the configuration of the embodiment. As a result, it is possible to suppress the generation of a phenomenon (a double image) that the two images A and B are simultaneously observed by the observer. As described above, in a case where the same width of the proper viewing region is realized in the embodiment and the comparative example, it is possible to decrease the proper viewing distance D by employing the configuration of the embodiment.

In the present embodiment, since the lens layer 124 is provided in the liquid crystal panel 120, it is possible to more thin the image display apparatus 100 compared with a case where the lens plate is provided outside the liquid crystal panel. In particular, although the lens layers 224A to 224D, 224Aa and 224Ab are formed on the second glass substrate 220A in the modified examples (FIGS. 6, 7 and 8), the lens layer La is formed in the second glass substrate 220 in the embodiment (FIG. 3). Accordingly, if the configuration of the embodiment is employed, it is possible to significantly thin the image display device (liquid crystal panel).

In the present embodiment, since the lens layer 124 is used, it is possible to increase the brightness of an image to be displayed, compared with a case of using a barrier plate in which a plurality of openings is provided.

The invention is not limited to the above-described embodiments and various modifications may be made without departing from the spirit or scope of the invention. For example, the following modifications are possible.

(1) Although the image display apparatus displays two images in the above-described embodiments, at least three images may be displayed. In this case, the cylindrical lenses included in the lens layer 124 are provided for at least consecutive three pixels.

Although the cylindrical lenses are provided for two lenses which are continuous in the horizontal direction (row direction) in the above-described embodiments, the cylindrical lenses may be provided for two pixels which are continuous in the vertical direction (column direction).

Although, in the above-described embodiments, the images are formed in a portion of a group of pixels arranged in a stripe shape in the liquid crystal panel 120 as described in FIG. 2, the images may be formed in a portion of a group of pixels arranged in a step shape in the liquid crystal panel 120. In this case, a plurality of cylindrical lenses arranged in the step shape may be included in the lens layer 124, instead of the plurality of cylindrical lenses arranged in a line shape.

In general, each of the plurality of lenses included in the lens layer is provided for at least two pixels, which is continuous in one direction, among the plurality of pixels.

(2) Although the lens layer 124 is provided nearer to the observer side than the image forming layer 122, the image forming layer 122 may be provided nearer to the observer side than the lens layer 124.

(3) Although a transmissive liquid crystal panel is used in the above-described embodiments, a reflective liquid crystal panel may be used.

(4) Although the liquid crystal panel 120 and the backlight 110 are used in the above-described embodiments, a self light-emitting display panel such as a plasma display panel (PDP), an electroluminescence (EL) display or a field emission display (FED) may be used.

(5) Although the invention is applied to an image display device for two-dimensional image display apparatus in the above-described embodiments, the invention is applicable to an image display device for a stereoscopic image display apparatus. In the image display device for the two-dimensional image display apparatus, the distance G between the image forming layer 122 and the lens layer 124 is, for example, set to about 50 μm as described above. However, in the stereoscopic image display device, the distance G is, for example, set to about 500 μm.

In a case where a two-dimensional image or a stereoscopic image is displayed by a mobile electronic apparatus, it is preferable that a proper viewing distance is set to be a relatively small value. If the invention is applied, since two images can be divided by a relative small proper viewing distance, the invention is suitable for a mobile electronic apparatus.

(6) In the above-described embodiments, a portion of the configuration realized by hardware may be realized software and a portion of the configuration realized by software may be realized by hardware.

(7) In the above-described embodiments, the lens layer includes a layer having a relatively high refractive index (a high refractive index layer) and a layer having a relatively low refractive index (a low refractive index layer). The material of the refractive index layers is as follows.

As the material of the high refractive index layer, for example, a monomer such as bis(4-methacryloil-thiophenyl) sulfide, vinylnaphthalene, or 4-methacryloxyphenyl-4'-methoxyphenylthioether may be used. In order to increase the refractive index, a composition obtained by dispersing inorganic particles having a high refractive index in a liquid mixture containing a monomer, an initiator and an organic-substituted silicon compound is cured. The inorganic particles, for example $ZrO_2$ or $TiO_2$ may be used.

As the material of the high refractive index layer, a polymer such as acrylic resin such as PMMA, polycarbonate resin, polyether sulfone resin, styrene resin such as polystyrene, polyolefin resin, epoxy resin, or polyester resin such as polyethylene terephthalate may be used.

Meanwhile, as the material of the low refractive index layer, for example, a porous material which can transmit light, aerogel (porous material), porous silica, magnesium fluoride or a material containing the same, gel in which particles of magnesium fluoride is dispersed, a fluorine-based polymer or a material containing the same, a porous polymer having a branch structure such as dendrimer, or a material obtained by containing any one of inorganic particles or organic particles in a predetermined material may be used. The aerogel is obtained by drying wet gel under a supercritical condition.

As the material of the low refractive index layer, a mixture obtained by mixing a fluorocarbon compound having a low refractive index and fusibility or dispersion in a polymer binder may be obtained. As the polymer binder, polyvinyl alcohol, polyacrylic acid, polyvinylpyrrolidone, polyvinylsulfonic acid sodium salt, polyvinylmethylether, polyethyleneglycol, poly(α-trifluoromethylacrylic acid) polyvinylmethylether-co-maleimide, polyethyleneglycol-co-propyleneglycol, or polymethacrylate acid may be used. As the fluorocarbon compound having a low refractive index, perfluorooctanoate-ammonium salt, perfluorooctanoate-tetramethylammonium salt, C-7 and C-10 perfluoroalkylsulfonic acid ammonium salt, C-7 and C-10 perfluoroalkylsulfonic acid tetramethylammonium salt, fluorinated alkyl quaternary ammonium iodide, perfluoroadipic acid, or quaternary ammonium salt of perfluoroadipic acid may be used.

The refractive index layers configured by the polymer are, for example formed as follows. A precursor of a polymer or a monomer is formed on a base material (corresponding to the second glass substrate 220A) and is cured or polymerized. That is, a polymer layer is formed by coating a base material with a monomer having high flowability and curing and polymerizing the monomer. When the formed polymer layer is dried under a supercritical condition, a solvent which is left in the polymer layer or the precursor of the polymer or the monomer can be removed. In a case where the polymer layer is a porous material, it is possible to maintain porosity when the polymer layer is dried under the supercritical condition.

The refractive index of the high refractive index layer is, for example, set to about 1.54. In this case, the refractive index of the low refractive index layer is preferably set to about 1.5 or less and more preferably about 1.2 or less.

The entire disclosure of Japanese Patent Application Nos: 2007-029384, filed Feb. 8, 2007 and 2007-288608, filed Nov. 6, 2007 are expressly incorporated by reference herein.

What is claimed is:

1. An image display device comprising:
    a display panel having an image forming layer disposed between a first substrate and a second light transmission substrate arranged opposite to each other, the display panel including a plurality of pixels for forming a plurality of images; and
    a plurality of lenses formed in an outside surface of the second light transmission substrate, the plurality of lenses guiding the plurality of images formed in the display panel in a plurality of corresponding directions, the plurality of lenses composing a lens layer,
    wherein the plurality of lenses includes:
    a first layer composed of the second light transmission substrate having a first refractive index;
    a second layer having a second refractive index lower than the first refractive index; and
    a third layer having a third refractive index higher than the second refractive index,
    wherein the second layer is provided at an outside surface of the first layer between the first layer and the third layer, and
    wherein the third layer includes a plurality of convex surfaces at the side of the second layer.

2. The image display device according to claim 1, wherein:
    the lens layer further includes a fourth layer having a fourth refractive index lower than the first refractive index,
    the first layer is provided between the second layer and the fourth layer, and
    the first layer includes a plurality of convex surfaces at the side of the fourth layer.

3. The image display device according to claim 1, wherein each of the plurality of lenses included in the lens layer has a plane portion in a most protruding region.

4. The image display device according to claim 1, wherein each of the plurality of lenses included in the lens layer has a Fresnel cross-section.

5. The image display device according to claim 1, wherein:
    the image forming layer includes a plurality of pixels, and
    the plurality of lenses included in the lens layer are provided for at least two pixels, which are continuous in one direction, among the plurality of pixels.

6. The image display device according to claim 1, wherein the lens layer is provided nearer to an observer side than the image forming layer.

7. The image display device according to claim 1, wherein the image forming layer includes a liquid crystal layer.

* * * * *